United States Patent
Sobue et al.

(10) Patent No.: US 12,341,571 B2
(45) Date of Patent: Jun. 24, 2025

(54) COMMUNICATION CONTROL DEVICE, VEHICLE INCLUDING THE SAME, AND COMMUNICATION CONTROL METHOD

(71) Applicant: KABUSHIKI KAISHA TOKAI RIKA DENKI SEISAKUSHO, Aichi (JP)

(72) Inventors: Keita Sobue, Aichi (JP); Yosuke Ohashi, Aichi (JP); Shingo Mochizuki, Aichi (JP); Norihiro Shimizu, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 302 days.

(21) Appl. No.: 18/008,559

(22) PCT Filed: Feb. 18, 2021

(86) PCT No.: PCT/JP2021/006056
§ 371 (c)(1),
(2) Date: Dec. 6, 2022

(87) PCT Pub. No.: WO2021/261007
PCT Pub. Date: Dec. 30, 2021

(65) Prior Publication Data
US 2023/0216542 A1    Jul. 6, 2023

(30) Foreign Application Priority Data
Jun. 23, 2020    (JP) .................... 2020-107509

(51) Int. Cl.
*H04B 5/00*    (2024.01)
*H04B 5/72*    (2024.01)
*H04W 52/02*    (2009.01)

(52) U.S. Cl.
CPC .......... *H04B 5/72* (2024.01); *H04W 52/0225* (2013.01)

(58) Field of Classification Search
CPC .... H04W 52/02; H04W 52/0225; H04B 5/00; H04B 5/72; H04B 5/0031
See application file for complete search history.

(56) References Cited

U.S. PATENT DOCUMENTS
2013/0116860 A1    5/2013    Kawai et al.

FOREIGN PATENT DOCUMENTS
JP    2013-100645 A    5/2013
JP    2014-93818 A     5/2014
WO   2008/084794 A1   7/2008

OTHER PUBLICATIONS

International Search Report issued in International Bureau of WIPO Patent Application No. PCT/JP2021/006056, dated May 18, 2021, along with an English translation thereof.

*Primary Examiner* — Tuan H Nguyen
(74) *Attorney, Agent, or Firm* — Greenblum & Bernstein, P.L.C.

(57) ABSTRACT

A polling processing unit executes a polling process for detecting a device that performs NFC communication. An NFC communication processing unit executes a communication process of performing NFC communication with a mobile device detected by the polling process. Power consumption associated with execution of the communication process is larger than power consumption associated with execution of the polling process. When authentication of the mobile device by an authentication processing unit is completed, or when the execution of the communication process continues for a prescribed time period, the NFC communication processing unit executes a stop process of stopping the communication process until the execution of the communication process is permitted.

9 Claims, 5 Drawing Sheets

COMMUNICATION CONTROL DEVICE, VEHICLE INCLUDING THE SAME, AND COMMUNICATION CONTROL METHOD

TECHNICAL FIELD

The present disclosure relates to a communication control device, a vehicle including the same, and a communication control method.

BACKGROUND ART

Communication systems are known that establish wireless communication between devices in accordance with the near field communication (NFC) standards. For example, Japanese Patent Laying-Open No. 2013-100645 (PTL 1) discloses a communication system that establishes wireless communication in accordance with the NFC standards between a mobile device such as a smartphone or a card and an in-vehicle communication device (reader), so as to allow the mobile device to unlock a vehicle door (see PTL 1).

CITATION LIST

Patent Literature

PTL 1: Japanese Patent Laying-Open No. 2013-100645

SUMMARY OF INVENTION

Technical Problem

In a communication scheme in accordance with the NFC standards, in order to search for a device that communicates in accordance with the NFC standards, a reader emits radio waves at regular intervals (polling). Then, when a mobile device capable of communication in accordance with the NFC standards is held over the reader, communication is initiated between the reader and the mobile device, and authentication (ID verification) of the mobile device is performed based on ID information transmitted from the mobile device to the reader.

Relative to the polling process of emitting radio waves at regular intervals, the communication process of communicating with the mobile device held over the reader consumes a larger amount of power associated with execution of the process. Therefore, if the mobile device is held over the reader for a long time period, the power consumption increases, thus possibly causing problems such as an unintended decrease in the amount of charge in a battery or the like that supplies operating power.

The present disclosure has been made to solve such a problem, and has an object to suppress power consumption in a communication control device that controls communication in accordance with the NFC standards, a vehicle including the same, and a communication control method.

Solution to Problem

A communication control device of the present disclosure is a communication control device that controls communication in accordance with NFC standards, and includes a control unit and an authentication unit. The control unit executes a polling process for detecting a device that communicates in accordance with the NFC standards, and a communication process of communicating in accordance with the NFC standards with a mobile device detected by the polling process. The authentication unit performs authentication of the mobile device while the communication process is being executed. Power consumption associated with execution of the communication process is larger than power consumption associated with execution of the polling process. When the authentication of the mobile device by the authentication unit is completed, or when the execution of the communication process continues for a prescribed time period, the control unit executes a stop process of stopping the communication process until the execution of the communication process is permitted.

A communication control method of the present disclosure is a communication control method that controls communication in accordance with NFC standards, and includes: executing a polling process for detecting a device that communicates in accordance with the NFC standards; executing a communication process of communicating in accordance with the NFC standards with a mobile device detected by the polling process; and performing authentication of the mobile device while the communication process is being executed. Power consumption associated with execution of the communication process is larger than power consumption associated with execution of the polling process. The communication control method further includes: executing, when the authentication of the mobile device is completed, a stop process of stopping the communication process until the execution of the communication process is permitted; and executing, when the execution of the communication process continues for a prescribed time period, the stop process until the execution of the communication process is permitted.

Advantageous Effects of Invention

According to the communication control device, the vehicle including the same, and the communication control method of the present disclosure, when the authentication of the mobile device is completed, or when the execution of the communication process continues for a prescribed time period, the communication process is stopped until the execution of the communication process is permitted. In this way, power consumption can be suppressed.

DESCRIPTION OF EMBODIMENTS

An embodiment of the present disclosure will be described in detail hereinafter with reference to the drawings, in which the same or corresponding portions are denoted by the same reference characters and description thereof will not be repeated.

Figure 1:
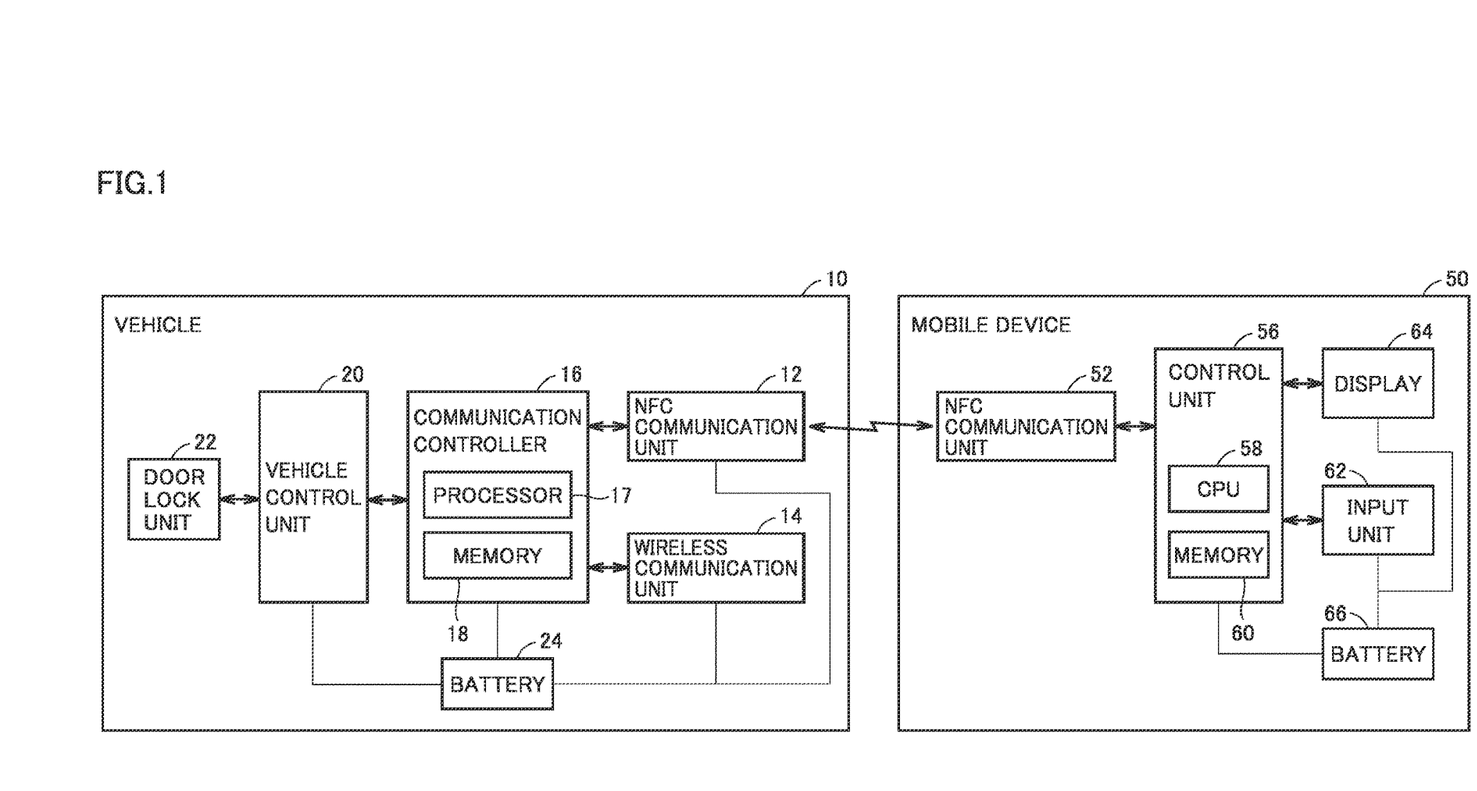
FIG. 1 is an overall block diagram of a wireless communication system to which a communication control device according to an embodiment of the present disclosure is applied.

FIG. 1 is an overall block diagram of a wireless communication system to which a communication control device according to an embodiment of the present disclosure is applied. Referring to FIG. 1, this wireless communication system includes a vehicle 10 equipped with a communication control device, and a mobile device 50. Vehicle 10 includes an NFC communication unit 12, a wireless communication unit 14, and a communication controller 16 that constitutes the communication control device. Though NFC communication unit 12, wireless communication unit 14, and communication controller 16 are illustrated as separate components in FIG. 1, some or all of these components may be mounted in the same unit (such as a chip).

NFC communication unit 12 is configured to communicate with mobile device 50 by a communication scheme in accordance with the NFC standards. NFC communication unit 12 can operate with power supplied from a battery 24, and perform communication in accordance with the NFC standards (hereinafter sometimes referred to as "NFC communication") with an NFC communication unit 52 of mobile device 50 through an antenna not shown in the figure. Among the NFC functions, at least reader/writer functions are incorporated in NFC communication unit 12. In addition to the reader/writer functions, a peer-to-peer communication (P2P) function may be incorporated.

Before communicating with mobile device 50, NFC communication unit 12 performs, in accordance with an instruction from communication controller 16, polling for detecting a device capable of NFC communication. In other words, NFC communication unit 12 transmits a request signal in accordance with the NFC standards to the surroundings at regular intervals. When NFC communication unit 12 receives a response signal transmitted from NFC communication unit 52 of mobile device 50 in response to the request signal, communication is established between NFC communication units 12 and 52, and NFC communication is performed between vehicle 10 and mobile device 50.

Wireless communication unit 14 is configured to, in accordance with an instruction from communication controller 16, communicate wirelessly with a user terminal not shown in the figure. Wireless communication unit 14 can communicate with the user terminal by a communication scheme such as Bluetooth® or Wi-Fi®, for example.

Communication controller 16 includes a processor 17 and a memory 18. Processor 17 is an arithmetic processing unit such as a central processing unit (CPU), a microcontroller or a microcomputer. Memory 18 is a storage device such as a random access memory (RAM) or a read only memory (ROM). Processor 17 reads and executes a program stored in the ROM of memory 18, to control NFC communication unit 12 and wireless communication unit 14. Memory 18 stores various types of programs for execution by processor 17, various types of data for use by processor 17, and the like. The specific processes executed by communication controller 16 will be described later.

Vehicle 10 further includes a vehicle control unit 20, a door lock unit 22, and battery 24. Door lock unit 22 is configured to switch the entrance doors of vehicle 10 between a locked state and an unlocked state.

Vehicle control unit 20 includes a CPU, a memory, signal input/output ports, and the like (none shown). Vehicle control unit 20 performs various types of control of vehicle 10, except for control performed by communication controller 16. As an example, when vehicle control unit 20 receives from communication controller 16 a notification indicating the completion of authentication of mobile device 50 detected by the polling (which will be described later), vehicle control unit 20 permits the operation of door lock unit 22 (locking/unlocking of the doors). Then, vehicle control unit 20 outputs an unlock command to door lock unit 22 in accordance with a request to unlock the entrance doors, and outputs a lock command to door lock unit 22 in accordance with a request to lock the entrance doors.

Battery 24 is an auxiliary battery of vehicle 10, and implemented, for example, by a lead acid battery. Battery 24 supplies operating power to NFC communication unit 12, wireless communication unit 14, communication controller 16, and vehicle control unit 20.

Mobile device 50 includes NFC communication unit 52, a control unit 56, an input unit 62, a display 64, and a battery 66.

NFC communication unit 52 is configured to communicate with vehicle 10 by a communication scheme in accordance with the NFC standards. NFC communication unit 52 can perform NFC communication with NFC communication unit 12 of vehicle 10 through an antenna not shown in the figure. NFC communication unit 52 includes a passive tag (IC tag) that operates by radio waves from NFC communication unit 12. In other words, NFC communication unit 52 operates by radio waves received from NFC communication unit 12 without receiving power supply from battery 66. Accordingly, NFC communication unit 52 can communicate with NFC communication unit 12 of vehicle 10 even when mobile device 50 is powered off.

When NFC communication unit 52 receives the request signal transmitted from NEC communication unit 12, NFC communication unit 52 generates a response signal including ID information that is unique to corresponding mobile device 50 and written in the passive tag (IC tag), modulates the generated response signal, and transmits the modulated response signal to NFC communication unit 12 of vehicle 10.

Control unit 56 includes a CPU 58, a memory 60, signal input/output ports (not shown), and the like. Control unit 56 performs various types of control of mobile device 50. Input unit 62 is a device that accepts various input operations by a user on mobile device 50, and implemented, for example, by a touch sensor that detects a touch operation on display 64, or various operation buttons provided on mobile device 50. Display 64 displays various types of information of mobile device 50, information corresponding to an input operation from input unit 62, and the like. Input unit 62 and display 64 may be integrally formed as a touch panel sensor.

Battery 66 is a chargeable and dischargeable secondary battery, and implemented, for example, by a lithium-ion secondary battery. Battery 66 can be charged by an external power supply using a charging device not shown in the figure. Battery 66 then supplies operating power to control unit 56, input unit 62, and display 64. Since NFC communication unit 52 includes the passive tag that operates by radio waves from NFC communication unit 12 as described above, NFC communication unit 52 does not receive power supply from battery 66.

Figure 2:
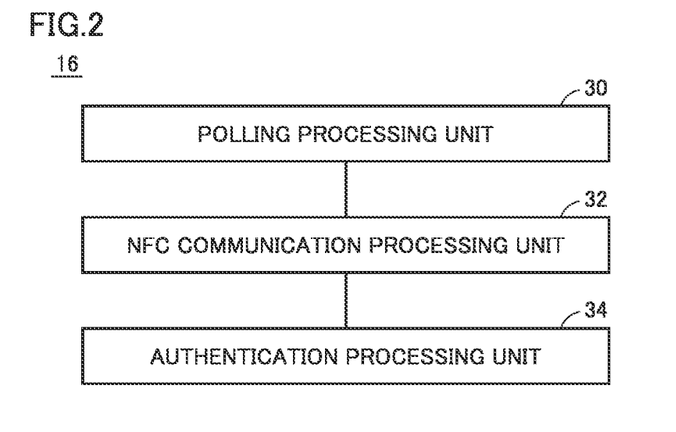
FIG. 2 is a block diagram showing a configuration of a communication controller shown in FIG. 1.

FIG. 2 is a block diagram showing a configuration of communication controller 16 shown in FIG. 1. Referring to FIG. 2, communication controller 16 includes a polling processing unit 30, an NFC communication processing unit 32, and an authentication processing unit 34.

Polling processing unit 30 executes polling for detecting a device capable of NFC communication. Specifically, polling processing unit 30 controls NFC communication unit 12 such that radio waves are emitted from NFC communication unit 12 to the surroundings at regular intervals. In this way, a request signal for detecting a device capable of NFC communication is transmitted from NFC communication unit 12 to the surroundings at regular intervals. The regular interval is set appropriately based on power consumption associated with the polling process, and a time delay in detecting the device.

NFC communication processing unit 32 executes various communication processes in accordance with the NFC standards with a device detected by the polling (hereinafter assumed to be mobile device 50). In detail, when NFC communication unit 12 receives a response signal transmitted from NFC communication unit 52 of mobile device 50 in response to the request signal by the polling, NFC communication processing unit 32 establishes communication with mobile device 50, and controls NFC communication unit 12 such that radio waves are transmitted from NFC communication unit 12 to NFC communication unit 52 of mobile device 50. In this way, NFC communication is performed between NFC communication unit 12 and NFC communication unit 52 that operates by receiving the radio waves from NFC communication unit 12.

Authentication processing unit 34 executes an authentication process of verifying authentication data (ID information) transmitted from mobile device 50 against ID information stored in memory 18 (FIG. 1). Memory 18 stores ID information of a device (mobile device 50) permitted to operate door lock unit 22. When authentication processing unit 34 confirms that the ID information received from mobile device 50 matches the ID information stored in memory 18, authentication processing unit 34 completes the authentication of mobile device 50 and notifies vehicle control unit 20 (FIG. 1) accordingly.

In this way, authenticated mobile device 50 can be used to perform the operation of door lock unit 22 (locking/unlocking of entrance doors). The ID information stored in memory 18 may be stored in a memory (not shown) of vehicle control unit 20, or in NFC communication unit 12.

As described above, in this wireless communication system, a communication scheme in accordance with the NFC standards is used for communication between vehicle 10 and mobile device 50. In the communication scheme in accordance with the NFC standards, in order to search for a device that performs NFC communication, radio waves are emitted from NFC communication unit 12 (reader) at regular intervals (polling). Then, when mobile device 50 capable of communication in accordance with the NFC standards is held over NFC communication unit 12, communication is established between NEC communication unit 12 and NEC communication unit 52 of mobile device 50, and radio waves are transmitted from NFC communication unit 12 to NEC communication unit 52, allowing communication to be performed between NFC communication units 12 and 52 (NFC communication).

Figure 3:
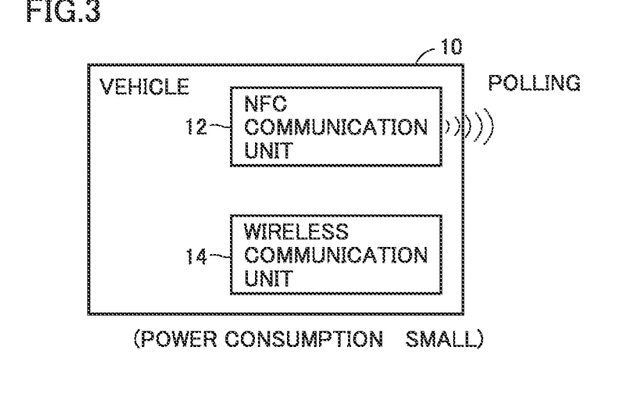
FIG. 3 shows a manner of polling before a mobile device is held over an NFC communication unit.
Figure 4:
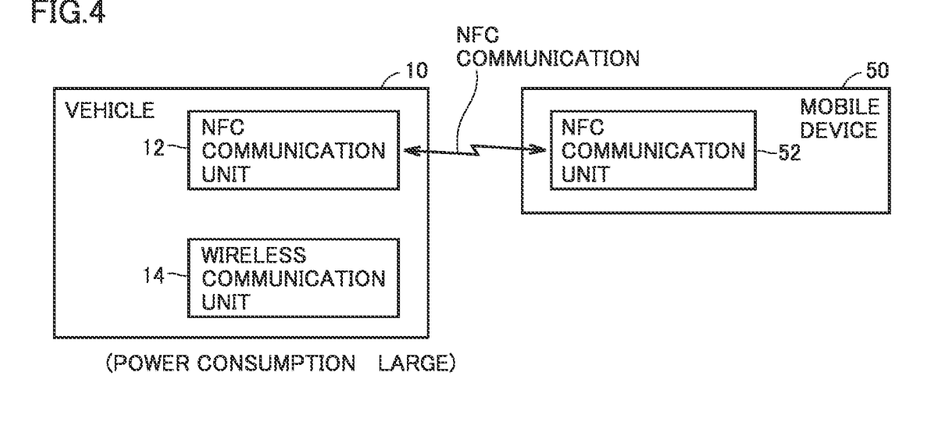
FIG. 4 shows a manner of NFC communication while the mobile device is held over the NFC communication unit.

FIG. 3 shows a manner of polling before mobile device 50 is held over NFC communication unit 12. FIG. 4 shows a manner of NFC communication while mobile device 50 is held over NFC communication unit 12.

Referring to FIG. 3, in the polling, NFC communication unit 12 emits radio waves to the surroundings at regular intervals. During the polling, power consumption associated with execution of the polling process is smaller than during the NFC communication which will be described later, as there is not yet a device that operates by receiving the radio waves, the radio waves are output at regular intervals rather than continuously, and so on.

Referring to FIG. 4, on the other hand, in the NFC communication, radio waves are transmitted from NFC communication unit 12 to NFC communication unit 52 of mobile device 50, and NFC communication unit 52 operates by receiving the radio waves, allowing communication to be performed between NFC communication units 12 and 52. During the NFC communication, power consumption associated with execution of the NFC communication is larger than during the polling, as NFC communication unit 52 of mobile device 50 operates by receiving the radio waves from NFC communication unit 12, such radio waves as operating power are transmitted continuously rather than at regular intervals, and so on.

Thus, if mobile device 50 is held over NFC communication unit 12 for a long time period, the power consumption increases, thus possibly causing problems such as an unintended decrease in the amount of charge in battery 24 (FIG. 1). A possible situation where mobile device 50 is held over NFC communication unit 12 for a long time period may be, for example, when a mobile device with unregistered ID information is accidentally held over the unit, or when someone other than the user maliciously holds a mobile device over the unit.

In the wireless communication system of the present embodiment, therefore, when the authentication of mobile device 50 by authentication processing unit 34 is completed, or when the execution of the NFC communication by NFC communication processing unit 32 continues for a prescribed time period, the NFC communication is stopped. This stopping of the NFC communication is continued until the execution of the NFC communication is permitted. In other words, once the NFC communication is stopped, the NFC communication is not executed even when mobile device 50 is held over NFC communication unit 12, and the authentication process is not executed either, until the execution of the NFC communication is permitted. This can prevent an increase in power consumption due to mobile device 50 being held over NFC communication unit 12 for a long time period.

In the wireless communication system of the present embodiment, the stopped NFC communication process can be resumed from the user's terminal. In the present embodiment, therefore, when the NFC communication process is stopped, an abnormality notification (a notification indicating that the NFC communication has been stopped) is sent from vehicle 10 to the user's terminal.

Figure 5:
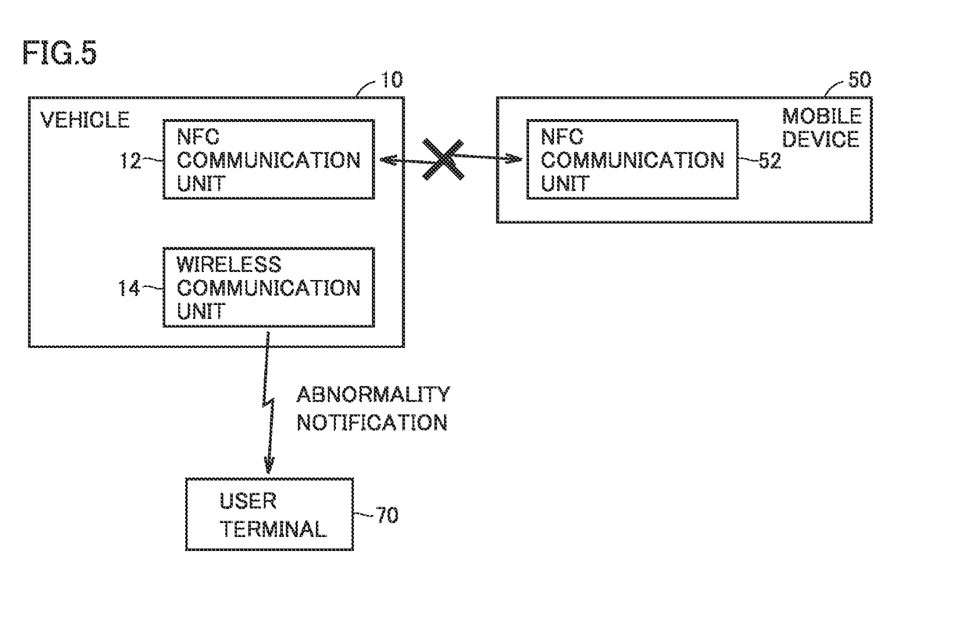
FIG. 5 shows a manner in which an NFC communication process is stopped.

FIG. 5 shows a manner in which the NFC communication process is stopped. Referring to FIG. 5, when the NFC communication process is stopped due to mobile device 50 being held over NFC communication unit 12 for a long time period, the abnormality notification is sent from wireless communication unit 14 to a terminal 70 (such as a smartphone) of the user. User terminal 70 may be mobile device 50. In this way, the user can recognize that the NFC communication process has been stopped. Then, in this case, the user can resume the stopped NFC communication process from user terminal 70.

Figure 6:
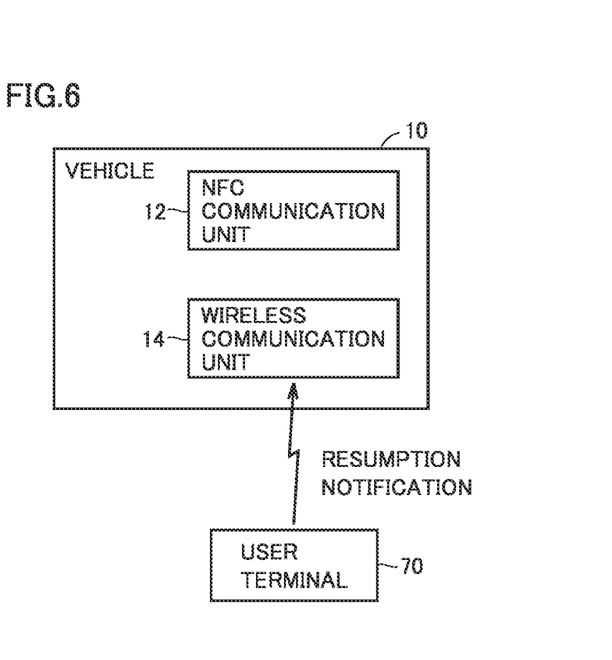
FIG. 6 shows a manner in which the NFC communication is resumed from a user terminal.

FIG. 6 shows a manner in which the NFC communication is resumed from user terminal 70. Referring to FIG. 6, when user terminal 70 receives the abnormality notification from wireless communication unit 14 of vehicle 10, user terminal 70 can send a notification of resumption of the NFC communication process to vehicle 10 in accordance with the user's operation. This allows the user to decide a period of time during which the NFC communication process is stopped, thereby enhancing security.

Then, when wireless communication unit 14 of vehicle 10 receives the resumption notification from user terminal 70, the NFC communication process is permitted in vehicle 10. Thereafter, the NFC communication is performed again when mobile device 50 is held over NFC communication unit 12.

Further, in the wireless communication system of the present embodiment, even when the notification of resumption of the NFC communication process is not sent from user terminal 70, the NFC communication process is permitted when a prescribed time period elapses from the stopping of the NFC communication process. In this way, the communication that has been suspended to suppress the power consumption can be performed again without the need for operation of user terminal 70.

Figure 7:
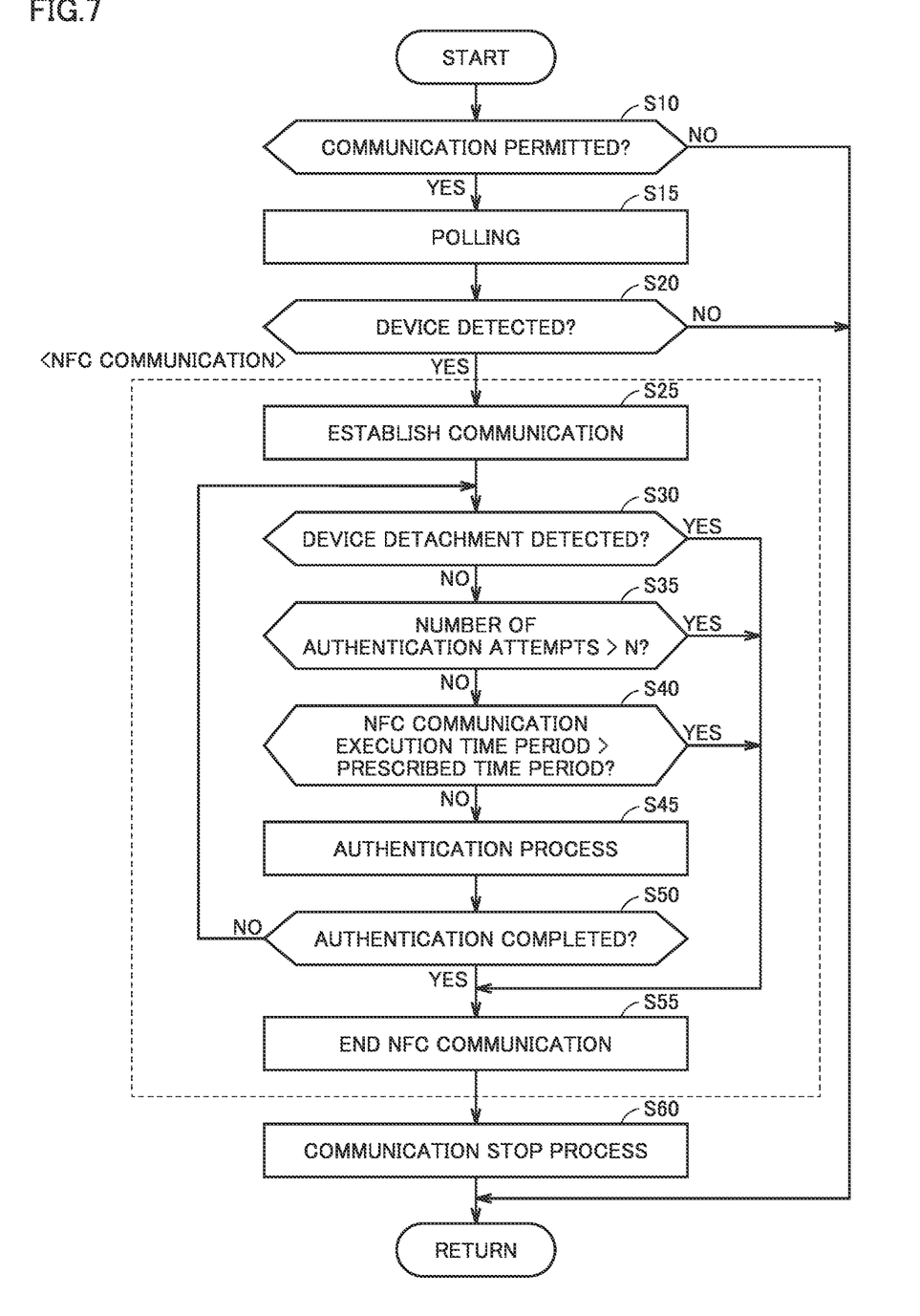
FIG. 7 is a flowchart showing an example procedure for a process executed by the communication controller shown in FIG. 1.

FIG. 7 is a flowchart showing an example procedure for a process executed by communication controller 16 shown in FIG. 1. Referring to FIG. 7, communication controller 16 determines whether or not the execution of communication with a device capable of NEC communication has been permitted (step S10). As described above, when the NFC communication is stopped, the stopping of the NFC communication is continued until the execution of the NFC communication is permitted. The conditions under which the suspended communication is permitted will be described later in a communication stop process of step S60. When the communication has not been permitted (NO in step S10), the process moves to a return step without execution of a series of subsequent process steps.

When it is determined in step S10 that the communication has been permitted (YES in step S10), communication controller 16 executes polling (step S15). In other words, in accordance with an instruction from communication controller 16, a request signal for detecting a device capable of NFC communication is transmitted from NFC communication unit 12 to the surroundings at regular intervals.

Then, communication controller 16 determines whether or not a device that performs NFC communication has been detected by the polling (step S20). Specifically, communication controller 16 determines whether or not NFC communication unit 12 has received a response signal transmitted from the device that performs NFC communication in response to the request signal by the polling. When the device has not been detected (NO in step S20), the process moves to the return step without execution of the subsequent process steps.

When it is determined in step S20 that the device has been detected (YES in step S20), communication controller 16 executes an NFC communication process with the detected device (it is hereinafter assumed that mobile device 50 in FIG. 1 has been detected). In other words, communication controller 16 establishes communication between NFC communication unit 12 and NFC communication unit 52 of mobile device 50 (step S25).

During the execution of the NFC communication process, communication controller 16 determines whether or not detachment of mobile device 50 from NFC communication unit 12 (separation of mobile device 50 by such a distance that the communication is impossible between NFC communication units 12 and 52) has been detected (step S30). For example, if there is no response from mobile device 50 in response to a response request from NFC communication unit 12, it is detected that mobile device 50 has been detached. When the detachment of mobile device 50 has been detected (YES in step S30), communication controller 16 ends the NFC communication (step S55). In other words, communication controller 16 stops the transmission of radio waves from NFC communication unit 12 to NFC communication unit 52 of mobile device 50.

When the detachment of mobile device 50 has not been detected (NO in step S30), communication controller 16 determines whether or not the number of attempts of an authentication process has exceeded N times (N is a prescribed natural number; for example, N=10) (step S35). The authentication process will be described in step S45. When the authentication process is completed, the number of attempts is reset to 0. When the number of attempts of the authentication process has exceeded N times (YES in step S35), communication controller 16 moves the process to step S55 and ends the NFC communication.

When the number of attempts of the authentication process has not exceeded N times (NO in step S35), communication controller 16 determines whether or not an execution time period of the NFC communication has exceeded a prescribed time period (for example, 10 seconds) (step S40). This process is intended to suppress an increase in power consumption due to mobile device 50 being held over NFC communication unit 12 for a long time period. When the execution time period of the NFC communication has exceeded the prescribed time period (YES in step S40), communication controller 16 moves the process to step S55 and ends the NFC communication. When the NFC communication is ended, the execution time period described above is reset to 0.

When the execution time period of the NFC communication has not exceeded the prescribed time period (NO in step S40), communication controller 16 executes an authentication process on the device (mobile device 50) detected in step S20 (step S45). In other words, communication controller 16 verifies authentication data (ID information) received by NFC communication unit 12 from mobile device 50 against ID information stored in memory 18 (FIG. 1).

Then, communication controller 16 determines whether or not the authentication has been completed (step S50). When communication controller 16 confirms that the ID information received from mobile device 50 matches the ID information stored in memory 18, communication controller 16 completes the authentication (ID verification) of mobile device 50. When the authentication has not been completed (NO in step S50), communication controller 16 returns the process to step S30 and attempts to obtain the ID information from mobile device 50 again.

When it is determined in step S50 that the authentication has been completed (YES in step S50), communication controller 16 ends the NFC communication (step S55). In other words, though the NFC communication is ended such as when the detachment of the device is detected, or when the execution time period of the NFC communication exceeds the prescribed time period, in the present embodiment, the NFC communication is also ended when the authentication is completed. This can suppress an increase in power consumption due to mobile device 50 being held over NFC communication unit 12 for a long time period even after the authentication has been completed.

When the NFC communication is stopped in step S55, the stopping of the NFC communication is continued until the execution of the NFC communication is permitted in a communication stop process which will be described later. Though the polling may be resumed when the device is detached from NFC communication unit 12, or may be activated at all times, when the NFC communication is stopped in step S55, the NFC communication is not executed even when the device is held over NFC communication unit 12 until the execution of the NFC communication is permitted. Since the stopping of the communication is continued until the execution of the NFC communication is permitted, in the present embodiment, when the NFC communication is stopped, the polling is also stopped until the execution of the communication is permitted.

Then, communication controller 16 executes a communication stop process associated with the ending of the NFC communication (step S60).

Figure 8:
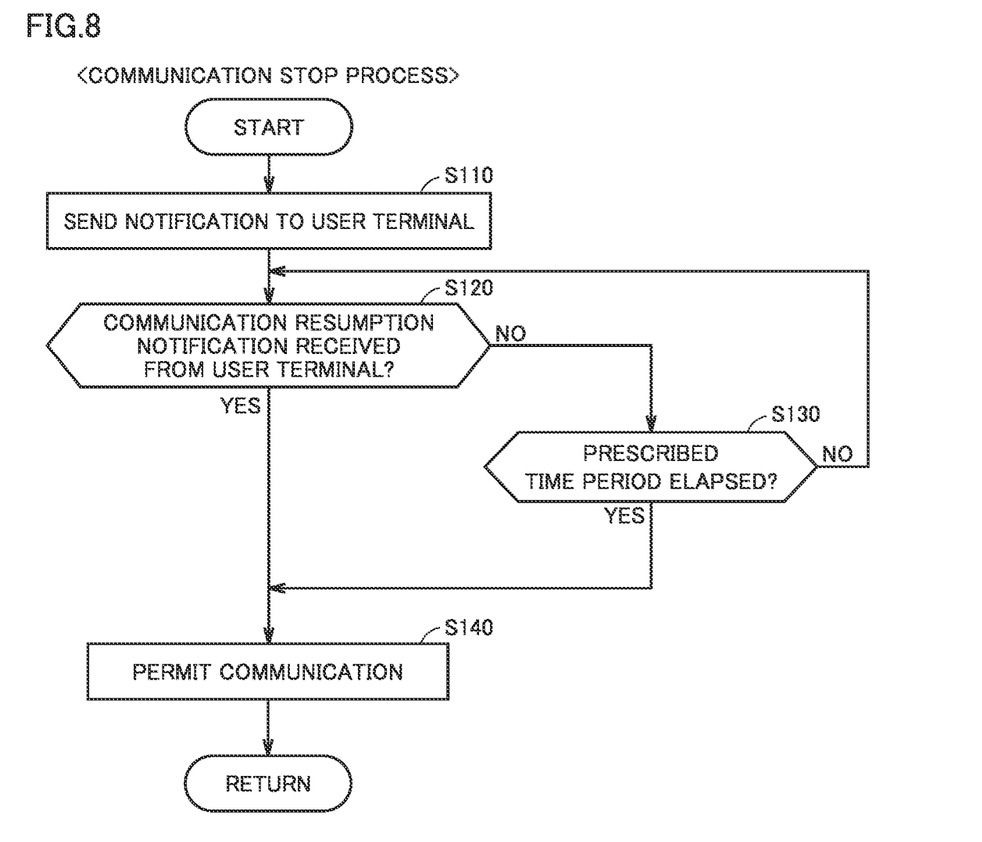
FIG. 8 is a flowchart showing an example procedure for a communication stop process executed in step S60 of FIG. 7.

FIG. 8 is a flowchart showing an example procedure for the communication stop process executed in step S60 of FIG. 7. Referring to FIG. 8, communication controller 16 controls wireless communication unit 14 to send to user terminal 70 (FIG. 5) an abnormality notification indicating that the NFC communication has been stopped (step S110).

Then, communication controller 16 determines whether or not wireless communication unit 14 has received a notification of resumption of the NFC communication process from user terminal 70 (step S120). In other words, as shown in FIG. 6, in the present embodiment, the resumption of the NFC communication can be permitted from user terminal 70 that has received the abnormality notification indicating that the NFC communication has been stopped.

Then, when it is determined in step S120 that wireless communication unit 14 has received the communication resumption notification from user terminal 70 (YES in step S120), communication controller 16 permits the execution of the communication with a device capable of NFC communication (step S140). When the execution of the communication is permitted, the polling is started (steps S10 and S15 in FIG. 7).

When the communication resumption notification has not been received from user terminal 70 (NO in step S120), communication controller 16 determines whether or not a prescribed time period has elapsed since the NFC communication was stopped in step S55 (FIG. 7) (step S130). When the prescribed time period has not elapsed (NO in step S130), the process is returned to step S120.

When the prescribed time period has elapsed since the NFC communication was stopped (YES in step S130), communication controller 16 moves the process to step S140 and permits the execution of the communication with a device capable of NFC communication. In other words, in the present embodiment, even when the communication resumption notification has not been received from user terminal 70, the execution of the communication is permitted when the prescribed time period elapses from the stopping of the communication. In this way, the stopped NFC communication can be resumed without the need for operation of user terminal 70.

As described above, in this embodiment, when the authentication of mobile device 50 is completed, or when the execution of the NFC communication process continues for a prescribed time period, the communication process is stopped until the execution of the communication process is permitted. Since the power consumption associated with execution of the communication process is larger than the power consumption associated with execution of the polling, the power consumption can be suppressed according to this embodiment.

Though mobile device 50 provided with NFC communication unit 52 is a device (for example, a smartphone) including control unit 56, battery 66 and the like in the embodiment above, mobile device 50 may be a card or the like not including control unit 56, battery 66 and the like.

Though communication controller 16 is provided separately from vehicle control unit 20 in vehicle 10 in the embodiment above, the functions of communication controller 16 may be included in vehicle control unit 20.

Though NFC communication unit 12, wireless communication unit 14, and communication controller 16 are mounted on vehicle 10 in the embodiment above, the scope of the present disclosure is not limited to a communication control device mounted on a vehicle. For example, NFC communication unit 12, wireless communication unit 14, and communication controller 16 may be provided in a house or a home delivery box, and mobile device 50 may be used as a key to lock/unlock a door of the house or the home delivery box.

It should be understood that the embodiment disclosed herein is illustrative and non-restrictive in every respect. The technical scope indicated by the present disclosure is defined by the terms of the claims, rather than the description of the embodiment above, and is intended to include any modifications within the scope and meaning equivalent to the terms of the claims.

The illustrative embodiment described above is a specific example of aspects described below.

A communication control device in one aspect is a communication control device that controls communication in accordance with NFC standards, and includes a control unit and an authentication unit. The control unit executes a polling process for detecting a device that performs NFC communication, and a communication process of performing NFC communication with a mobile device detected by the polling process. The authentication unit performs authentication of the mobile device while the communication process is being executed. Power consumption associated with execution of the communication process is larger than power consumption associated with execution of the polling process. When the authentication of the mobile device by the authentication unit is completed, or when the execution of the communication process continues for a prescribed time period, the control unit executes a stop process of stopping the communication process until the execution of the communication process is permitted.

A communication control method in one aspect is a communication control method that controls communication in accordance with NFC standards, and includes: executing a polling process for detecting a device that performs NFC communication; executing a communication process of performing NFC communication with a mobile device detected by the polling process; and performing authentication of the mobile device while the communication process is being executed. Power consumption associated with execution of the communication process is larger than power consumption associated with execution of the polling process. The communication control method further includes: executing, when the authentication of the mobile device is completed, a stop process of stopping the communication process until the execution of the communication process is permitted; and executing, when the execution of the communication process continues for a prescribed time period, the stop process until the execution of the communication process is permitted.

In the communication control device and the communication control method described above, when the authentication of the mobile device by the authentication unit is completed, or when the execution of the communication process continues for a prescribed time period, the stop process of stopping the communication process is executed until the execution of the communication process is permitted. Since the power consumption associated with execution of the communication process is larger than the power consumption associated with execution of the polling process, the power consumption can be suppressed according to these communication control device and communication control method.

In the stop process, the control unit may stop the polling process in addition to stopping the communication process. In this way, the power consumption can be further suppressed.

Upon executing the stop process, the control unit may execute a process of sending a notification to a user's terminal. In this way, the user can recognize that the NFC communication has been stopped by the stop process.

Upon receiving from the user's terminal a notification that permits the execution of the communication process, the control unit may permit the execution of the communication process. This allows the user to decide a period of time during which the communication is not permitted, thereby enhancing security.

When a prescribed time period elapses from a start of the stop process, the control unit may permit the execution of the communication process. In this way, the communication that has been suspended to suppress the power consumption can be performed again, without the user having to operate the terminal.

REFERENCE SIGNS LIST 10 vehicle; 12, 52 NFC communication unit; 14 wireless communication unit; 16 communication controller; 17 processor; 18, 60 memory; 20 vehicle control unit; 22 door lock unit; 24, 66 battery; 30 polling processing unit; 32 NFC communication processing unit; 34 authentication processing unit; 50 mobile device; 56 control unit; 58 CPU; 62 input unit; 64 display; 70 user terminal.

The invention claimed is:

1. A communication control device that controls communication in accordance with near field communication (NFC) standards, the communication control device comprising:
a control unit that executes a polling process for detecting a device that communicates in accordance with the NFC standards, and a communication process of communicating in accordance with the NFC standards with a mobile device detected by the polling process; and
an authentication unit that performs authentication of the mobile device while the communication process is being executed, wherein
power consumption associated with execution of the communication process is larger than power consumption associated with execution of the polling process,
when the authentication of the mobile device by the authentication unit is completed, or when the execution of the communication process continues for a prescribed time period, the control unit executes a stop process of stopping the communication process until the execution of the communication process is permitted, and
upon executing the stop process, the control unit executes a process of sending a notification to a terminal of a user.

2. The communication control device according to claim 1, wherein
in the stop process, the control unit stops the polling process in addition to stopping the communication process.

3. The communication control device according to claim 1, wherein
upon receiving from the terminal of the user a notification that permits the execution of the communication process, the control unit permits the execution of the communication process.

4. The communication control device according to claim 1, wherein
when a defined time period elapses from a start of the stop process, the control unit permits the execution of the communication process.

5. A vehicle comprising:
a communication unit that communicates in accordance with the NFC standards, and
the communication control device according to claim 1.

6. A communication control method that controls communication in accordance with near field communication (NFC) standards, the communication control method comprising:
executing a polling process for detecting a device that communicates in accordance with the NFC standards;
executing a communication process of communicating in accordance with the NFC standards with a mobile device detected by the polling process;
performing authentication of the mobile device while the communication process is being executed,
power consumption associated with execution of the communication process being larger than power consumption associated with execution of the polling process;
executing, when the authentication of the mobile device is completed, a stop process of stopping the communication process until the execution of the communication process is permitted;
executing, when the execution of the communication process continues for a prescribed time period, the stop process until the execution of the communication process is permitted; and
upon executing the stop process, sending a notification to a terminal of a user of the mobile device.

7. The communication control method according to claim 6, further comprising, upon receiving from the terminal of the user a notification that permits the execution of the communication process, permitting the execution of the communication process.

8. The communication control method according to claim 6, further comprising, when a defined time period elapses from a start of the stop process, permitting the execution of the communication process.

9. A communication control device that controls communication in accordance with near field communication (NFC) standards, the communication control device comprising:
a processor; and
a memory including a program that, when executed by the processor, causes the processor to perform functions, the functions including:
executing a polling process for detecting a device that communicates in accordance with the NFC standards, and a communication process of communicating in accordance with the NFC standards with a mobile device detected by the polling process; and
performing authentication of the mobile device while the communication process is being executed, wherein
power consumption associated with execution of the communication process is larger than power consumption associated with execution of the polling process,
when the authentication of the mobile device by the processor is completed, or when the execution of the communication process continues for a prescribed time period, the processor executes a stop process of stopping the communication process until the execution of the communication process is permitted, and upon executing the stop process, the processor executes a process of sending a notification to a terminal of a user.

\* \* \* \* \*